United States Patent
Andersen et al.

(10) Patent No.: US 8,932,973 B2
(45) Date of Patent: *Jan. 13, 2015

(54) DISORDERED MOLECULAR SIEVE SUPPORTS FOR THE SELECTIVE CATALYTIC REDUCTION OF $NO_x$

(75) Inventors: Paul J. Andersen, Plymouth Meeting, PA (US); John Leonello Casci, Redcar (GB); Hai-Ying Chen, Conshohocken, PA (US); Joseph M. Fedeyko, Glen Mills, PA (US)

(73) Assignee: Johnson Matthey Public Limited Company, London (GB)

( * ) Notice: Subject to any disclaimer, the term of this patent is extended or adjusted under 35 U.S.C. 154(b) by 566 days.

This patent is subject to a terminal disclaimer.

(21) Appl. No.: 13/353,873

(22) Filed: Jan. 19, 2012

(65) Prior Publication Data

US 2012/0189518 A1  Jul. 26, 2012

Related U.S. Application Data (63) Continuation of application No. PCT/US2011/028123, filed on Mar. 11, 2011.

(60) Provisional application No. 61/312,832, filed on Mar. 11, 2010.

(51) Int. Cl.
  *B01J 29/04* (2006.01)
  *B01J 29/06* (2006.01)
  (Continued)

(52) U.S. Cl.
  CPC .............. *B01J 29/80* (2013.01); *B01D 53/9418* (2013.01); *B01J 29/72* (2013.01); *B01J 35/04* (2013.01); *B01J 37/0246* (2013.01); *B01J 29/005* (2013.01); *B01J 29/78* (2013.01); *B01D 2251/2062* (2013.01); *B01D 2255/1021* (2013.01); *B01D 2255/2073* (2013.01); *B01D 2255/20738* (2013.01);
  (Continued)

(58) Field of Classification Search
  None
  See application file for complete search history.

(56) References Cited

U.S. PATENT DOCUMENTS

| | | |
|---|---|---|
| 5,958,818 A | 9/1999 | Demmel et al. |
| 6,334,994 B1 | 1/2002 | Wendelbo et al. |

(Continued)

FOREIGN PATENT DOCUMENTS

| | | |
|---|---|---|
| EP | 1 057 519 A1 | 12/2000 |
| WO | WO-01/80978 A1 | 11/2001 |

(Continued)

OTHER PUBLICATIONS

International Search Report dated May 6, 2011, from PCT International Application No. PCT/US11/28123.

*Primary Examiner* — Melvin Curtis Mayes
*Assistant Examiner* — Sheng H Davis
(74) *Attorney, Agent, or Firm* — Jimmie D. Johnson, Jr.

(57) ABSTRACT

A catalyst for selective catalytic reduction of $NO_x$ having one or more transition metals selected from Cr, Mn, Fe, Co, Ce, Ni, Cu, Zn, Ga, Mo, Ru, Rh, Pd, Ag, In, Sn, Re, Ir, Pt, and mixtures thereof supported on a support, wherein the support has a molecular sieve having at least one intergrowth phase having at least two different small-pore, three-dimensional framework structures.

19 Claims, 6 Drawing Sheets

(51) Int. Cl.
*B01J 21/00* (2006.01)
*B01J 27/182* (2006.01)
*B01J 29/80* (2006.01)
*B01D 53/94* (2006.01)
*B01J 29/72* (2006.01)
*B01J 35/04* (2006.01)
*B01J 37/02* (2006.01)
*B01J 29/00* (2006.01)
*B01J 29/78* (2006.01)
*B01J 29/85* (2006.01)

(52) U.S. Cl.
CPC ........... *B01D 2255/20746* (2013.01); *B01D 2255/20761* (2013.01); *B01D 2255/50* (2013.01); *B01D 2257/404* (2013.01); *B01D 2258/012* (2013.01); *B01J 29/723* (2013.01); *B01J 2229/62* (2013.01); *B01J 29/783* (2013.01); *B01J 29/85* (2013.01); *B01J 2229/18* (2013.01)

USPC ............... 502/60; 502/63; 502/64; 502/66; 502/67; 502/69; 502/74; 502/214

(56) References Cited

U.S. PATENT DOCUMENTS

| | | | |
|---|---|---|---|
| 7,094,389 | B2 | 8/2006 | Cao et al. |
| 8,101,146 | B2 | 1/2012 | Fedeyko et al. |
| 2002/0165089 | A1 | 11/2002 | Janssen et al. |
| 2003/0072694 | A1 | 4/2003 | Hodgson et al. |
| 2006/0079724 | A1 | 4/2006 | Loezos et al. |
| 2006/0105904 | A1 | 5/2006 | Chang et al. |
| 2007/0161840 | A1 | 7/2007 | Xu et al. |
| 2008/0299016 | A1 | 12/2008 | Sobolevskiy et al. |

FOREIGN PATENT DOCUMENTS

| | | |
|---|---|---|
| WO | WO-02/070407 A1 | 9/2002 |
| WO | WO-2005/063623 A2 | 7/2005 |
| WO | WO-2008/132452 A2 | 11/2008 |

DISORDERED MOLECULAR SIEVE SUPPORTS FOR THE SELECTIVE CATALYTIC REDUCTION OF $NO_x$

CROSS-REFERENCE TO RELATED APPLICATIONS

This application is a continuation of PCT International Application No. PCT/US2011/028123, filed Mar. 11, 2011, and claims priority of U.S. Provisional Application No. 61/312,832, filed Mar. 11, 2010, the disclosures of both of which are incorporated herein by reference in their entireties for all purposes.

FIELD OF THE INVENTION

The present invention relates to supports used for catalysts in selective catalytic reduction.

BACKGROUND OF THE INVENTION

Selective catalytic reduction (SCR) of $NO_x$ by nitrogenous compounds, such as ammonia or urea, has developed for numerous applications including for treating industrial stationary applications, thermal power plants, gas turbines, coal-fired power plants, plant and refinery heaters and boilers in the chemical processing industry, furnaces, coke ovens, municipal waste plants and incinerators, and a number of vehicular (mobile) applications, e.g., for treating diesel exhaust gas.

Several chemical reactions occur in an $NH_3$ SCR system, all of which represent desirable reactions that reduce $NO_x$ to nitrogen. The dominant reaction is represented by reaction (1).

$$4NO+4NH_3+O_2 \rightarrow 4N_2+6H_2O \quad (1)$$

Competing, non-selective reactions with oxygen can produce secondary emissions or may unproductively consume ammonia. One such non-selective reaction is the complete oxidation of ammonia, shown in reaction (2).

$$4NH_3+5O_2 \rightarrow 4NO+6H_2O \quad (2)$$

Also, side reactions may lead to undesirable products such as $N_2O$, as represented by reaction (3).

$$4NH_3+4NO+3O_2 \rightarrow 4N_2O+6H_2O \quad (3)$$

Catalysts for SCR of $NO_x$ with $NH_3$ may include, for example, aluminosilicate molecular sieves. One application is to control $NO_x$ emissions from vehicular diesel engines with the reductant obtainable from an ammonia precursor, such as urea, or by injecting ammonia per se. To promote the catalytic activity, transition metals may be incorporated into the aluminosilicate molecular sieves. The most commonly tested transition metal molecular sieves are Cu/ZSM-5, Cu/Beta, Fe/ZSM-5 and Fe/Beta because they have a relatively wide temperature activity window.

WO 2008/132452 discloses a method of converting nitrogen oxides in a gas to nitrogen by contacting the nitrogen oxides with a nitrogenous reducing agent in the presence of a molecular sieve catalyst containing at least one transition metal. The molecular sieve is a small pore zeolite containing a maximum ring size of eight tetrahedral atoms, wherein the at least one transition metal is selected from the group consisting of Cr, Mn, Fe, Co, Ce, Ni, Cu, Zn, Ga, Mo, Ru, Rh, Pd, Ag, In, Sn, Re, Ir and Pt.

SUMMARY OF THE INVENTION

Disordered molecular sieve supported transition metal catalysts may exhibit improved $NH_3$—SCR activity along with good thermal and hydrothermal stability. The catalysts may also tolerate repeated lean/rich high temperature aging. In certain applications, the support (i.e., molecular sieve) per se also demonstrates catalytic activity. Thus, the term "catalyst" is not limited to the metal component of compositions described herein.

According to one embodiment of the present invention, a catalyst for selective catalytic reduction of $NO_x$ comprises one or more transition metals selected from the group consisting of Cr, Mn, Fe, Co, Ce, Ni, Cu, Zn, Ga, Mo, Ru, Rh, Pd, Ag, In, Sn, Re, Ir, Pt, and mixtures thereof supported on a support. The support comprises a molecular sieve having at least one disorder.

According to another embodiment of the present invention, a catalyst for selective catalytic reduction of $NO_x$ comprises one or more transition metals selected from the group consisting of Cr, Mn, Fe, Co, Ce, Ni, Cu, Zn, Ga, Mo, Ru, Rh, Pd, Ag, In, Sn, Re, Ir, Pt, and mixtures thereof and a support. The support comprises a molecular sieve comprising at least two different framework structures and at least one intergrown phase of the at least two different framework structures.

According to another embodiment of the present invention, a catalyst for selective catalytic reduction of $NO_x$ comprises one or more transition metals selected from the group consisting of Cr, Mn, Fe, Co, Ce, Ni, Cu, Zn, Ga, Mo, Ru, Rh, Pd, Ag, In, Sn, Re, Ir, Pt, and mixtures thereof supported on a molecular sieve which comprises an intergrown crystal of at least two different framework structures.

According to another embodiment of the present invention, a method for reducing $NO_x$ in a gas comprises exposing the gas having at least one reactant, such as $NO_x$, to a catalyst. The catalyst comprises one or more transition metals supported on a support, wherein the support comprises an intergrowth of at least two different framework structures.

BRIEF DESCRIPTION OF THE DRAWINGS

In order that the invention may be more fully understood, reference is made to the following figures by way of illustration only, in which.

DETAILED DESCRIPTION OF THE INVENTION

Aspects of the present invention include catalysts, the molecular sieve supports selected for the catalysts, and the use of the catalysts in selective catalytic reduction of $NO_x$.

According to one embodiment of the present invention, a catalyst for selective catalytic reduction of $NO_x$ comprises one or more transition metals selected from the group consisting of Cr, Mn, Fe, Co, Ce, Ni, Cu, Zn, Ga, Mo, Ru, Rh, Pd, Ag, In, Sn, Re, Ir, Pt, and mixtures thereof supported on a support, wherein the support comprises a molecular sieve having at least one disorder.

Molecular sieves are well-known to those skilled in the art. As is used herein "molecular sieve" is understood to mean a metastable material containing pores of a precise and uniform size that may be used as an adsorbent for gases or liquids. The molecules which are small enough to pass through the pores are adsorbed while the larger molecules are not. The molecular sieve framework may be defined as is generally acceptable by the International Zeolite Association (IZA) Framework Type Codes (at http://www.iza-online.org/). The framework type describes the molecular sieve or zeolite structure including its arrangement of cages, the dimensionality of a channel system, and the approximate size of pore openings. The composition, the geometry of the framework, and the number and the nature of defects are also relevant. The pore size of the molecular sieves may be defined by the member rings as follows: large pore rings are 12-member rings or larger; medium pore rings are 10-member rings; and small pore rings are 9-member rings or smaller. Preferably, small pore rings have 8-member rings or smaller.

It will be appreciated that by defining the molecular sieve by its Framework Type Code (FTC), the "Type Material" (e.g., the species first used to establish the framework type) and any and all isotypic framework materials are included. Use of a FTC herein is intended to refer to the Type Material and all isotypic framework materials defined by that FTC. The distinction between molecular sieve type materials, such as naturally occurring (i.e. mineral), and isotypes within the same Framework Type Code may reflect differences in the properties between the materials, for example, which may be evident during use in selective catalytic reduction.

Molecular sieves for use in the present application include natural and synthetic molecular sieves. It may be preferable to use synthetic molecular sieves because the molecular sieves may have a more uniform silica-to-alumina ratio (SAR), crystallite size, crystallite morphology, and the absence of impurities (e.g. alkaline earth metals).

Molecular sieves may be ordered or disordered. Ordered molecular sieves (e.g., regular crystalline solids) are crystal structures which are periodically ordered in 3-dimensions. Ordered molecular sieves may also be considered "pure" molecular sieves. These structures are classified based on their repeating periodic building units (PerBUs) and may be termed "end-member structures" if periodic ordering occurs in all three dimensions. Disordered molecular sieves, on the other hand, show periodic ordering in dimensions less than 3, e.g., 0, 1, or 2 dimensions. In disordered structures, the stacking sequence of the PerBUs deviates from periodic ordering. This may also be explained as a structural or stacking disorder of structurally invariant PerBUs. The supports used for the catalysts of the present invention comprise a molecular sieve having at least one disorder or defect. In other words, the molecular sieve is a disordered structure and does not have periodic ordering in all three dimensions.

The selected molecular sieve may have a defect or disorder including, but not limited to, stacking disorders, planar faults, and intergrowth of phases. In a layered structure with a stacking disorder, a single framework type may deviate from periodic ordering. A planar fault in the framework structure may include, for example, structures on either side of the plane which are mirror images (e.g., a "twin plane" phenomenon) or rotation of one part of a crystal, on a specific plane, with respect to another. An intergrowth of phases may include a transition from one framework structure to another framework structure. Thus, the molecular sieve may include any one or more types of defects or disorders leading to any known or unknown disordered framework. Known disordered frameworks include, for example, ABC-6, AEI/CHA, AEI/SAV, AEN/UEI, AFS/BPH, BEC/ISV, beta, fuajasite, ITE/RTH, KFI/SAV, lovdarite, montesommaite, MTT/TON, pentasils, SBS/SBT, SSF/STF, SSZ-33, and ZSM-48. The molecular sieves disclosed herein may be obtained or prepared from any suitable source known in the art.

In the case of regular AEI and CHA framework type molecular sieves, for example, the periodic building unit is a double six ring layer. There are two types of layers "a" and "b", which are topologically identical except "b" is the mirror image of "a". When layers of the same type stack on top of one another, i.e. aaaaaaaa or bbbbbbbb, the framework type CHA is generated. When layers "a" and "b" alternate, i.e., ababa-bab, the framework type AEI is generated. Intergrown AEI-CHA molecular sieves may comprise regions of CHA framework sequences and regions of AEI framework sequences. Each change from a CHA to an AEI framework type sequence results in a stacking fault, an example of a disorder. In addition, stacking faults can occur in a pure CHA phase material when a sequence of one mirror image layers intersects a sequence of the opposite mirror image layers, such as for example in aaaaaabbbbbbb.

In an exemplary embodiment, the disorder of the molecular sieve is an intergrowth of two phases of at least two different framework structures. In other words, a single intergrown crystal may comprise at least two different framework structures. Intergrown molecular sieve phases may be disordered planar intergrowths of molecular sieve frameworks. The two different framework structures may include, for example, a mixed phase of one or more of AEI/CHA, AEI/SAV, AEN/UEI, AFS/BPH, BEC/ISV, ITE/RTH, KFI/SAV, IMTT/TON, SBS/SBT, and SSF/STF.

In one embodiment of the present invention, a catalyst for selective catalytic reduction of $NO_x$ comprises one or more transition metals and a support, wherein the support comprises a molecular sieve comprising at least one intergrown phase of at least two different framework structures. An intergrown phase may include an area of the crystal where one framework structure is transitioned into a different framework structure. In other words, the intergrown phase may be a part of the crystal structure which serves to complete both types of frameworks. Thus, the molecular sieve may include one or more intergrowth regions with two or more framework structures throughout the support.

In an exemplary embodiment, the framework structure is a small pore molecular sieve. A small pore molecular sieve may be defined as having a maximum ring size of nine tetrahedral atoms. In a preferred embodiment, the at least two different framework structures are both small pore molecular sieves. Similarly, if there are more than two framework structures, all may be small pore molecular sieves. Illustrative examples of suitable small pore molecular sieves are set out in Table 1.

TABLE 1

Small Pore Molecular Sieve

| Molecular Sieve Framework Type (by Framework Type Code) | Type material* and illustrative isotypic framework structures | Dimensionality | Pore size (Å) | Additional info |
|---|---|---|---|---|
| ACO | *ACP-1 | 3D | 3.5 × 2.8, 3.5 × 3.5 | Ring sizes—8, 4 |
| AEI | *AlPO-18<br>[Co—Al—P—O]-AEI<br>SAPO-18<br>SIZ-8<br>SSZ-39 | 3D | 3.8 × 3.8 | Ring sizes—8, 6, 4 |
| AEN | *AlPO-EN3<br>AlPO-53(A)<br>AlPO-53(B)<br>[Ga—P—O]-AEN<br>CFSAPO-1A<br>CoIST-2<br>IST-2<br>JDF-2<br>MCS-1<br>MnAPO-14<br>Mu-10<br>UiO-12-500<br>UiO-12-as | 2D | 4.3 × 3.1, 2.7 × 5.0 | Ring sizes—8, 6, 4 |
| AFN | *AlPO-14<br>|(C$_3$N$_2$H$_{12}$)—|[Mn—Al—P—O]-AFN<br>GaPO-14 | 3D | 1.9 × 4.6, 2.1 × 4.9, 3.3 × 4.0 | Ring sizes—8, 6, 4 |
| AFT | *AlPO-52 | 3D | 3.8 × 3.2, 3.8 × 3.6 | Ring sizes—8, 6, 4 |
| AFX | *SAPO-56<br>MAPSO-56, M = Co, Mn, Zr<br>SSZ-16 | 3D | 3.4 × 3.6 | Ring sizes—8, 6, 4 |
| ANA | *Analcime<br>AlPO$_4$-pollucite<br>AlPO-24<br>Ammonioleucite<br>[Al—Co—P—O]-ANA<br>[Al—Si—P—O]-ANA<br>|Cs—|[Al—Ge—O]-ANA<br>|Cs—|[Be—Si—O]-ANA<br>|Cs$_{16}$|[Cu$_8$Si$_{40}$O$_{96}$]-ANA<br>|Cs—Fe|[Si—O]-ANA<br>|Cs—Na—(H$_2$O)|[Ga—Si—O]-ANA<br>[Ga—Ge—O]-ANA<br>|K—|[B—Si—O]-ANA<br>|K—|[Be—B—P—O]-ANA<br>|Li—|[Li—Zn—Si—O]-ANA<br>|Li—Na|[Al—Si—O]-ANA<br>|Na—|[Be—B—P—O]-ANA<br>|(NH$_4$)—|[Be—B—P—O]-ANA<br>|(NH$_4$)—|[Zn—Ga—P—O]-ANA<br>[Zn—As—O]-ANA<br>Ca-D<br>Hsianghualite<br>Leucite<br>Na—B<br>Pollucite<br>Wairakite | 3D | 4.2 × 1.6 | Ring sizes—8, 6, 4 |
| APC | *AlPO-C<br>AlPO-H3<br>CoAPO-H3 | 2D | 3.7 × 3.4, 4.7 × 2.0 | Ring sizes—8, 6, 4 |
| APD | *AlPO-D<br>APO-CJ3 | 2D | 6.0 × 2.3, 5.8 × 1.3 | Ring sizes—8, 6, 4 |
| ATT | *AlPO-12-TAMU<br>AlPO-33<br>RMA-3 | 2D | 4.6 × 4.2, 3.8 × 3.8 | Ring sizes—8, 6, 4 |
| CDO | *CDS-1<br>MCM-65<br>UZM-25 | 2D | 4.7 × 3.1, 4.2 × 2.5 | Ring sizes—8, 5 |
| CHA | *Chabazite<br>AlPO-34<br>[Al—As—O]-CHA<br>[Al—Co—P—O]-CHA | 3D | 3.8 × 3.8 | Ring sizes—8, 6, 4 |

TABLE 1-continued

Small Pore Molecular Sieve

| Molecular Sieve Framework Type (by Framework Type Code) | Type material* and illustrative isotypic framework structures | Dimensionality | Pore size (Å) | Additional info |
|---|---|---|---|---|
| | \|Co\| [Be—P—O]-CHA | | | |
| | \|Co$_3$ (C$_6$N$_4$H$_{24}$)$_3$ (H$_2$O)$_9$\| [Be$_{18}$P$_{18}$O$_{72}$]-CHA | | | |
| | [Co—Al—P—O]-CHA | | | |
| | \|Li—Na\| [Al—Si—O]-CHA | | | |
| | [Mg—Al—P—O]-CHA | | | |
| | [Si—O]-CHA | | | |
| | [Zn—Al—P—O]-CHA | | | |
| | [Zn—As—O]-CHA | | | |
| | CoAPO-44 | | | |
| | CoAPO-47 | | | |
| | DAF-5 | | | |
| | GaPO-34 | | | |
| | K-Chabazite | | | |
| | Linde D | | | |
| | Linde R | | | |
| | LZ-218 | | | |
| | MeAPO-47 | | | |
| | MeAPSO-47 | | | |
| | (Ni(deta)$_2$)-UT-6 | | | |
| | Phi | | | |
| | SAPO-34 | | | |
| | SAPO-47 | | | |
| | SSZ-13 | | | |
| | UiO-21 | | | |
| | Willhendersonite | | | |
| | ZK-14 | | | |
| | ZYT-6 | | | |
| CHI | Chiavennite | 1D | 3.9 × 4.3 | |
| DDR | *Deca-dodecasil 3R | 2D | 4.4 × 3.6 | Ring sizes—8, 6, 5, 4 |
| | [B—Si—O]-DDR | | | |
| | Sigma-1 | | | |
| | ZSM-58 | | | |
| DFT | *DAF-2 | 3D | 4.1 × 4.1, 4.7 × 1.8 | Ring sizes—8, 6, 4 |
| | ACP-3, [Co—Al—P—O]-DFT | | | |
| | [Fe—Zn—P—O]-DFT | | | |
| | [Zn—Co—P—O]-DFT | | | |
| | UCSB-3GaGe | | | |
| | UCSB-3ZnAs | | | |
| | UiO-20, [Mg—P—O]-DFT | | | |
| EAB | *TMA-E | 2D | 5.1 × 3.7 | Ring sizes—8, 6, 4 |
| | Bellbergite | | | |
| EDI | *Edingtonite | 3D | 2.8 × 3.8, 3.1 × 2.0 | Ring sizes—8, 4 |
| | \|(C$_3$H$_{12}$N$_2$)$_{2.5}$\| [Zn$_5$P$_5$O$_{20}$]-EDI | | | |
| | [Co—Al—P—O]-EDI | | | |
| | [Co—Ga—P—O]-EDI | | | |
| | \|Li—\|[Al—Si—O]-EDI | | | |
| | \|Rb$_7$ Na (H$_2$O)$_3$\| [Ga$_8$Si$_{12}$O$_{40}$]-EDI | | | |
| | [Zn—As—O]-EDI | | | |
| | K—F | | | |
| | Linde F | | | |
| | Zeolite N | | | |
| EPI | *Epistilbite | 2D | 4.5 × 3.7, 3.6 × 3.6 | Ring sizes—8, 4 |
| ERI | *Erionite | 3D | 3.6 × 5.1 | Ring sizes—8, 6, 4 |
| | AlPO-17 | | | |
| | Linde T | | | |
| | LZ-220 | | | |
| | SAPO-17 | | | |
| | ZSM-34 | | | |
| GIS | *Gismondine | 3D | 4.5 × 3.1, 4.8 × 2.8 | Ring sizes—8, 4 |
| | Amicite | | | |
| | [Al—Co—P—O]-GIS | | | |
| | [Al—Ge—O]-GIS | | | |
| | [Al—P—O]-GIS | | | |
| | [Be—P—O]-GIS | | | |
| | \|(C$_3$H$_{12}$N$_2$)$_4$\| [Be$_8$P$_8$O$_{32}$]-GIS | | | |
| | \|(C$_3$H$_{12}$N$_2$)$_4$\| [Zn$_8$P$_8$O$_{32}$]-GIS | | | |
| | [Co—Al—P—O]-GIS | | | |

TABLE 1-continued

Small Pore Molecular Sieve

| Molecular Sieve Framework Type (by Framework Type Code) | Type material* and illustrative isotypic framework structures | Dimensionality | Pore size (Å) | Additional info |
|---|---|---|---|---|
| | [Co—Ga—P—O]-GIS | | | |
| | [Co—P—O]-GIS | | | |
| | \|Cs$_4$\|[Zn$_4$B$_4$P$_8$O$_{32}$]-GIS | | | |
| | [Ga—Si—O]-GIS | | | |
| | [Mg—Al—P—O]-GIS | | | |
| | \|(NH$_4$)$_4$\|[Zn$_4$B$_4$P$_8$O$_{32}$]-GIS | | | |
| | \|Rb$_4$\|[Zn$_4$B$_4$P$_8$O$_{32}$]-GIS | | | |
| | [Zn—Al—As—O]-GIS | | | |
| | [Zn—Co—B—P—O]-GIS | | | |
| | [Zn—Ga—As—O]-GIS | | | |
| | [Zn—Ga—P—O]-GIS | | | |
| | Garronite | | | |
| | Gobbinsite | | | |
| | MAPO-43 | | | |
| | MAPSO-43 | | | |
| | Na-P1 | | | |
| | Na-P2 | | | |
| | SAPO-43 | | | |
| | TMA-gismondine | | | |
| GOO | *Goosecreekite | 3D | 2.8 × 4.0, 2.7 × 4.1, 4.7 × 2.9 | Ring sizes—8, 6, 4 |
| IHW | *ITQ-32 | 2D | 3.5 × 4.3 | Ring sizes—8, 6, 5, 4 |
| ITE | *ITQ-3 | 2D | 4.3 × 3.8, 2.7 × 5.8 | Ring sizes—8, 6, 5, 4 |
| | Mu-14 | | | |
| | SSZ-36 | | | |
| ITW | *ITQ-12 | 2D | 5.4 × 2.4, 3.9 × 4.2 | Ring sizes—8, 6, 5, 4 |
| LEV | *Levyne | 2D | 3.6 × 4.8 | Ring sizes—8, 6, 4 |
| | AlPO-35 | | | |
| | CoDAF-4 | | | |
| | LZ-132 | | | |
| | NU-3 | | | |
| | RUB-1 [B—Si—O]-LEV | | | |
| | SAPO-35 | | | |
| | ZK-20 | | | |
| | ZnAPO-35 | | | |
| KFI | ZK-5 | 3D | 3.9 × 3.9 | Ring sizes—8, 6, 4 |
| | \|18-crown-6\|[Al—Si—O]-KFI | | | |
| | [Zn—Ga—As—O]-KFI | | | |
| | (Cs,K)-ZK-5 | | | |
| | P | | | |
| | Q | | | |
| LOV | Lovdarite | 3D | 3.2 × 4.5, 3.0 × 4.2, 3.6 × 3.7 | Ring sizes—9, 8 |
| MER | *Merlinoite | 3D | 3.5 × 3.1, 3.6 × 2.7, 5.1 × 3.4, 3.3 × 3.3 | Ring sizes—8, 4 |
| | [Al—Co—P—O]-MER | | | |
| | \|Ba—\|[Al—Si—O]-MER | | | |
| | \|Ba—Cl—\|[Al—Si—O]-MER | | | |
| | [Ga—Al—Si—O]-MER | | | |
| | \|K—\|[Al—Si—O]-MER | | | |
| | \|NH$_4$—\|[Be—P—O]-MER | | | |
| | K-M | | | |
| | Linde W | | | |
| | Zeolite W | | | |
| MON | *Montesommaite | 2D | 4.4 × 3.2, 3.6 × 3.6 | Ring sizes—8, 5, 4 |
| | [Al—Ge—O]-MON | | | |
| NAB | Babesite | 2D | 2.7 × 4.1, 3.0 × 4.6 | |
| NAT | Natrolite | 3D | 2.6 × 3.9, 2.5 × 4.1 | Ring sizes—9, 8 |
| NSI | *Nu-6(2) | 2D | 2.6 × 4.5, 2.4 × 4.8 | Ring sizes—8, 6, 5 |
| | EU-20 | | | |
| OWE | *UiO-28 | 2D | 4.0 × 3.5, 4.8 × 3.2 | Ring sizes—8, 6, 4 |
| | ACP-2 | | | |
| PAU | *Paulingite | 3D | 3.6 × 3.6 | Ring sizes—8, 6, 4 |
| | [Ga—Si—O]-PAU | | | |
| | ECR-18 | | | |
| PHI | *Phillipsite | 3D | 3.8 × 3.8, 3.0 × 4.3, 3.3 × 3.2 | Ring sizes—8, 4 |
| | [Al—Co—P—O]-PHI | | | |
| | DAF-8 | | | |
| | Harmotome | | | |
| | Wellsite | | | |
| | ZK-19 | | | |

TABLE 1-continued

Small Pore Molecular Sieve

| Molecular Sieve Framework Type (by Framework Type Code) | Type material* and illustrative isotypic framework structures | Dimensionality | Pore size (Å) | Additional info |
|---|---|---|---|---|
| RHO | *Rho<br>[Be—As—O]-RHO<br>[Be—P—O]-RHO<br>[Co—Al—P—O]-RHO<br>\|H—\|[Al—Si—O]-RHO<br>[Mg—Al—P—O]-RHO<br>[Mn—Al—P—O]-RHO<br>\|Na$_{16}$Cs$_8$\|<br>[Al$_{24}$Ge$_{24}$O$_{96}$]-RHO<br>\|NH$_4$—\|[Al—Si—O]-RHO<br>\|Rb—\|[Be—As—O]-RHO<br>Gallosilicate ECR-10<br>LZ-214<br>Pahasapaite | 3D | 3.6 × 3.6 | Ring sizes—8, 6, 4 |
| RSN | RUB-17 | 3D | 3.3 × 4.4, 3.1 × 4.3, 3.4 × 4.1 | Ring sizes—9, 8 |
| RTH | *RUB-13<br>SSZ-36<br>SSZ-50 | 2D | 4.1 × 3.8, 5.6 × 2.5 | Ring sizes—8, 6, 5, 4 |
| SAT | *STA-2 | 3D | 5.5 × 3.0 | Ring sizes—8, 6, 4 |
| SAV | *Mg-STA-7<br>Co-STA-7<br>Zn-STA-7 | 3D | 3.8 × 3.8, 3.9 × 3.9 | Ring sizes—8, 6, 4 |
| SBN | *UCSB-9<br>SU-46 | 3D | TBC | Ring sizes—8, 4, 3 |
| SIV | *SIZ-7 | 3D | 3.5 × 3.9, 3.7 × 3.8, 3.8 × 3.9 | Ring sizes—8, 4 |
| STT | SSZ-23 | 2D | 3.7 × 5.3, 2.4 × 3.5 | Ring sizes—8, 7 |
| THO | *Thomsonite<br>[Al—Co—P—O]-THO<br>[Ga—Co—P—O]-THO<br>\|Rb$_{20}$\|[Ga$_{20}$Ge$_{20}$O$_{80}$]-THO<br>[Zn—Al—As—O]-THO<br>[Zn—P—O]-THO<br>[Ga—Si—O]-THO)<br>[Zn—Co—P—O]-THO | 3D | 2.3 × 3.9, 4.0 × 2.2, 3.0 × 2.2 | Ring sizes—8, 4 |
| TSC | *Tschörtnerite | 3D | 4.2 × 4.2, 5.6 × 3.1 | Ring sizes—8, 6, 4 |
| UEI | *Mu-18 | 2D | 3.5 × 4.6, 3.6 × 2.5 | Ring sizes—8, 6, 4 |
| UFI | *UZM-5 | 2D | 3.6 × 4.4, 3.2 × 3.2 (cage) | Ring sizes—8, 6, 4 |
| VNI | *VPI-9 | 3D | 3.5 × 3.6, 3.1 × 4.0 | Ring sizes—8, 5, 4, 3 |
| VSV | VPI-7 | 3D | 3.3 × 4.3, 2.9 × 4.2, 2.1 × 2.7 | Ring sizes—9, 8 |
| YUG | *Yugawaralite<br>Sr-Q | 2D | 2.8 × 3.6, 3.1 × 5.0 | Ring sizes—8, 5, 4 |
| ZON | *ZAPO-M1<br>GaPO-DAB-2<br>UiO-7 | 2D | 2.5 × 5.1, 3.7 × 4.4 | Ring sizes—8, 6, 4 |

Molecular sieves with application in the present invention can include those that have been treated to improve hydrothermal stability. Illustrative methods of improving hydrothermal stability include:

(i) Dealumination by: steaming and acid extraction using an acid or complexing agent e.g., EDTA—ethylenediaminetetracetic acid; treatment with acid and/or complexing agent; treatment with a gaseous stream of SiCl$_4$ (replaces Al in the molecular sieve framework with Si);

(ii) Cation exchange—use of multi-valent cations, such as La; and (iii) Use of phosphorous containing compounds (see e.g., U.S. Pat. No. 5,958,818).

The small pore molecular sieves may be phosphorous-containing or phosphorous-free. In one embodiment, at least one of the small pore molecular sieves is a phosphorous-containing molecular sieve. For example, one, two, or more of the framework structures in a mixed phase composition may be phosphorous-containing. In another embodiment, at least one of the small pore molecular sieves is a phosphorous-free molecular sieve. For example, one, two, or more of the framework structures in a mixed phase composition may be phosphorous-free.

In a particular embodiment, the small pore molecular sieve catalysts for use in the present invention may be selected from the group consisting of aluminosilicate molecular sieves, metal-substituted aluminosilicate molecular sieves, and aluminophosphate molecular sieves. Aluminophosphate molecular sieves with application in the present invention include aluminophosphate (AlPO) molecular sieves, metal substituted (MeAlPO) molecular sieves, silico-aluminophosphate (SAPO) molecular sieves, and metal substituted silico-aluminophosphate (MeAPSO) molecular sieves. SAPO molecular sieves may contain a three-dimensional microporous crystal framework structure of [SiO$_2$], [AlO$_2$]

and [PO$_2$] corner sharing tetrahedral units. AlPO molecular sieves may include crystalline microporous oxides, which have an AlPO$_4$ framework.

As used herein, "MeAPSO" and "MeAlPO" are intended to cover zeotypes substituted with one or more metals. Suitable substituent metals include one or more of, without limitation, As, B, Be, Co, Fe, Ga, Ge, Li, Mg, Mn, Zn and Zr. In an exemplary embodiment, at least one of the small pore molecular sieves is selected from the group consisting of aluminosilicate molecular sieves, metal-substituted aluminosilicate molecular sieves, and aluminophosphate molecular sieves.

Small pore aluminosilicate molecular sieves may have a silica-to-alumina ratio (SAR) of from 2 to 300, optionally 4 to 200, and preferably 8 to 150. It will be appreciated that higher SAR ratios are preferred to improve thermal stability but this may negatively affect transition metal exchange.

In an exemplary embodiment, one or more of the small pore molecular sieves is selected from the group of Framework Type Codes consisting of: ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON. In a preferred embodiment, one or more of the small pore molecular sieves may comprise a CHA Framework Type Code selected from SAPO-34, AlPO-34, SAPO-47, ZYT-6, CAL-1, SAPO-40, SSZ-62 or SSZ-13 and/or an AEI Framework Type Code of selected from AlPO-18, SAPO-18, SIZ-8, or SSZ-39.

In a preferred embodiment, the catalyst of the present invention comprises one or more transition metals selected from the group consisting of Cr, Mn, Fe, Co, Ce, Ni, Cu, Zn, Ga, Mo, Ru, Rh, Pd, Ag, In, Sn, Re, Ir, Pt, and mixtures thereof supported on a support, wherein the support comprises a molecular sieve having at least one intergrowth phase comprising at least two different small-pore, three-dimensional framework structures. It has been discovered that metal loaded molecular sieves having at least one intergrowth phase comprising at least two different small-pore, three-dimensional framework structures provide exceptionally good NO$_x$ reduction performance, for example in SCR applications, particularly at low temperatures (e.g., below about 350° C., preferably below about 250° C., for example about 150 to about 250° C. or about 200 to about 250° C.). Surprisingly, molecular sieves comprising or consisting of such intergrowths of two different frameworks perform substantially better than molecular sieves constructed of either framework alone. For example, a metal loaded molecular sieve comprising an AEI/CHA intergrowth has significantly improved low temperature NO$_x$ conversion compared to a metal loaded molecular sieve having only a CHA framework or having only an AEI framework.

In certain preferred embodiments, the intergrowth comprises at least two different small-pore, three-dimensional framework structures, each having a maximum of eight ring members. In a particularly preferred embodiment, the molecular sieve has at least one intergrowth phase comprising a first small-pore, three-dimensional framework structure and a second small-pore, three-dimensional framework structure, wherein said first and second frameworks are present in a mole ratio of about 1:99 to about 99:1. The composition's mole ratio can be determined by analytical techniques such as X-ray Diffraction (XRD) analysis.

Examples of preferred intergrowths comprise, or consist essentially of, a first framework structure which is CHA and said second framework structure which is selected from the group consisting of AEI, GME, AFX, AFT, and LEV. Preferred molecular sieves having the abovementioned frameworks include aluminosilicates, silico-aluminophosphates, and combinations thereof. Particularly preferred molecular sieves comprises an intergrowth of at least one of SAPO-34, SSZ-13, SAPO-47, CAL-1, SAPO-40, SSZ-62, and ZYT-6, and at least one of AlPO-18, SAPO-18, SIZ-8, SSZ-39, AlPO-52, SAPO-56, SSZ-16, AlPO-35, LZ-132, Nu-3, SAPO-35, ZK-20, and Gmelinite, more preferably intergrowth of at least one of SAPO-34 and SSZ-13 and at least one of SAPO-18, SSZ-39, SSZ-16, Nu-3, and Gmelinite, such as a SAPO-18/SAPO-34 intergrowth. For embodiments wherein the molecular sieve comprises or consists essentially an SAPO-18/SAPO-34 intergrowth, the two frameworks are preferably present in a mole ratio of about 1:99 to about 50:50, such as about 1:99 to about 20:80 or about 5:99 to about 15:85.

In one embodiment, the mixed phase composition is an AEI/CHA-mixed phase composition. The mole ratio of each framework type in the molecular sieve is not particularly limited, provided that each framework is present in an amount sufficient to improve the NO$_x$ performance of the material. For example, the mole ratio of AEI/CHA may range from about 5/95 to about 95/5, preferably about 60/40 to 40/60. In an exemplary embodiment, the mole ratio of AEI/CHA may range from about 5/95 to about 40/60.

Other examples of preferred intergrowths include CHA/AEI, CHA/GME, CHA/AFX, CHA/AFT, and CHA/LEV. Examples of other framework ratios for these preferred intergrowths include 1:99, 5:95, 10:90, 15:85, 20:80, 25:75, 30:70, 40:60, 50:50, 60:40, 70:30, 75:25, 80:20, 85:15, 90:10, 95:5, and 99:1. Thus, the present invention includes intergrowths of CHA/AEI, CHA/GME, CHA/AFX, CHA/AFT, or CHA/LEV wherein any two of the abovementioned mole ratios serve as boundaries for a framework mole ratio range.

It should be noted that the nomenclature used to describe intergrowths herein does not attribute significance to the order in which different frameworks appear. For example, CHA/AEI is equivalent to AEI/CHA. However, the ratio of different frameworks within an intergrowth does correspond to the order in which the frameworks are names. For example, 5:95 AEI/CHA represents an intergrowth having 5% AEI and 95% CHA.

The catalyst comprises one or more transition metals supported on the molecular sieve support. Any suitable transition metal may be selected. Transition metals particularly effective for use during selective catalytic reduction include transition metals selected from the group consisting of Cr, Mn, Fe, Co, Ce, Ni, Cu, Zn, Ga, Mo, Ru, Rh, Pd, Ag, In, Sn, Re, Ir, Pt, and mixtures thereof. As used herein, the term transition metal includes Zn, Ga, In, and Sn even though these metals are not in the d-block of the periodic table. In one embodiment, the one or more transition metals is selected from the group consisting of Cr, Mn, Fe, Co, Ce, Ni, Cu, Rh, Pd, Pt, and mixtures thereof. Preferably, the transition metal is selected from Cu, Fe, Co, Pt, and Mn. More preferably, the one or more transition metals may be selected from the group consisting of Fe, Cu, and mixtures thereof. In an exemplary embodiment, the transition metal is copper. Any suitable and effective amount of at least one transition metal may be used in the catalyst. The total amount of the transition metal(s) that may be included in the molecular sieve may be from about 0.01 to 20 wt % based on the total weight of the catalyst. In one embodiment, the total amount of the transition metal(s) that may be included may be from about 0.1 to 10 wt %. In a particular embodiment, the total transition metal amount that may be included is from about 0.5 to 5 wt %. In another embodiment, the amount of transition metal is from about 0.01 to about 6 weight percent, more preferably about 1 to about 3 weight percent, even more preferably about 1.5 to about 2.5 weight percent, based on the total weight of the support.

The molecular sieve acts as a support for the transition metal, e.g., the transition metal may be inside the pore(s) and/or may be on the external surface of the molecular sieve. In an exemplary embodiment, a significant amount of the transition metal(s) resides inside the pores.

The transition metal(s) may also be included in the molecular sieve and/or supported by the molecular sieve using any feasible method. For example, the transition metal can be added after the molecular sieve has been synthesized, e.g., by incipient wetness or exchange process; or can be added during molecular sieve synthesis.

The molecular sieves may be synthesized using any suitable processes known in the art. Suitable synthesis techniques are explained in U.S. Pat. Nos. 6,334,994, 7,094,389, U.S. Patent Application No. 2002/0165089, and PCT Patent Application No. WO2005/063623, all of which are incorporated herein by reference in their entireties.

The molecular sieve catalysts may be used in any suitable form. For example, the molecular sieve catalyst may be used in powder form, as extrudates, as pellets, or in any other suitable form.

The molecular sieve catalysts for use in the present invention may be coated on a suitable substrate monolith or can be formed as extruded-type catalysts, but are preferably used in a catalyst coating. In one embodiment, the molecular sieve catalyst is coated on a flow-through monolith substrate (i.e., a honeycomb monolithic catalyst support structure with many small, parallel channels running axially through the entire part) or filter monolith substrate, such as a wall-flow filter, etc. The molecular sieve catalyst for use in the present invention may be coated, e.g., as a washcoat component, on a suitable monolith substrate, such as a metal or ceramic flow through monolith substrate or a filtering substrate, such as a wall-flow filter or sintered metal or partial filter (such as those disclosed in WO 01/80978 or EP 1057519). Alternatively, the molecular sieves for use in the present invention may be synthesized directly onto the substrate and/or may be formed into an extruded-type flow through catalyst.

Washcoat compositions containing the molecular sieves for use in the present invention for coating onto the monolith substrate for manufacturing extruded type substrate monoliths may comprise a binder, such as alumina, silica, (non molecular sieve) silica-alumina, naturally occurring clays, such as $TiO_2$, $ZrO_2$, $SnO_2$, $CeO_2$, or mixtures thereof.

According to one embodiment of the present invention, a method of using the catalyst comprises exposing a catalyst to at least one reactant in a chemical process. In other words, a method for reducing $NO_x$ in a gas comprises exposing the gas having at least one reactant, such as $NO_x$, to a catalyst. As used herein, a chemical process for reducing $NO_x$ in a gas can include any suitable chemical process using a catalyst comprising a molecular sieve or zeolite. Typical chemical processes include, but are not limited to, exhaust gas treatment such as selective catalytic reduction using nitrogenous reductants, lean $NO_x$ catalyst, catalyzed soot filter, or a combination of any one of these with a $NO_x$ adsorber catalyst or a three-way catalyst (TWC), e.g., NAC+(downstream)SCR or TWC+(downstream)SCR.

A method of treating $NO_x$ in an exhaust gas of a lean burn internal combustion engine is to store the $NO_x$ from a lean gas in a basic material and then to release the $NO_x$ from the basic material and reduce it periodically using a rich gas. The combination of a basic material (such as an alkali metal, alkaline earth metal, or a rare earth metal), and a precious metal (such as platinum), and possibly also a reduction catalyst component (such as rhodium) is typically referred to as a $NO_x$ adsorber catalyst (NAC), a lean $NO_x$ trap (LNT), or a $NO_x$ storage/reduction catalyst (NSRC). As used herein, $NO_x$ storage/reduction catalyst, $NO_x$ trap, and $NO_x$ adsorber catalyst (or their acronyms) may be used interchangeably.

Under certain conditions, during the periodically rich regeneration events, $NH_3$ may be generated over a $NO_x$ adsorber catalyst. The addition of a SCR catalyst downstream of the $NO_x$ adsorber catalyst may improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions. As used herein, such combined systems may be shown as a combination of their respective acronyms, e.g., NAC+SCR or LNT+SCR.

The catalysts may be effective in reducing or lean conditions, e.g., as encountered in engine emissions. For example, the lean portion of the cycle may consist of exposure to about 200 ppm NO, 10% $O_2$, 5% $H_2O$, 5% $CO_2$ in $N_2$, and the rich portion of the cycle may consist of exposure to about 200 ppm NO, 5000 ppm $C_3H_6$, 1.3% $H_2$, 4% CO, 1% $O_2$, 5% $H_2O$, 5% $CO_2$ in $N_2$. A reducing atmosphere is an atmosphere having a lambda value of less than 1, i.e., the redox composition is net reducing. A lean atmosphere is one having a lambda value of greater than 1, i.e., the redox composition is net oxidizing. The catalysts described herein may be particularly effective when exposed to a reducing atmosphere, more particularly a high temperature reducing atmosphere, such as when encountered during the rich phase of a lean/rich excursion cycle.

A method for reducing $NO_x$ in a gas comprises exposing the gas having at least one reactant to a catalyst. The reactant may include any reactants typically encountered in the chemical processes above. Reactants may include a selective catalytic reductant, such as ammonia. Selective catalytic reduction may include (1) using ammonia or a nitrogenous reductant or (2) a hydrocarbon reductant (the latter also known as lean $NO_x$ catalysis). Other reactants may include nitrogen oxides and oxygen. In an exemplary embodiment, the catalysts described herein are used during selective catalytic reduction of $NO_x$ with ammonia.

In one embodiment, the at least one reactant, e.g., nitrogen oxides, is reduced with the reducing agent at a temperature of at least 100° C. In another embodiment, the at least one reactant is reduced with the reducing agent at a temperature from about 150° C. to 750° C. In a particular embodiment, the temperature range is from about 175 to 550° C.

For a reactant including nitrogen oxides, the reduction of nitrogen oxides may be carried out in the presence of oxygen or in the absence of oxygen. The source of nitrogenous reductant can be ammonia per se, hydrazine, ammonium carbonate, ammonium carbamate, ammonium hydrogen carbonate, ammonium formate or any suitable ammonia precursor, such as urea (($NH_2$)$_2$CO).

The method may be performed on a gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, coffee roasting plants, etc.

In a particular embodiment, the method is used for treating exhaust gas from a vehicular internal combustion engine with a lean/rich cycle, such as a diesel engine, a gasoline engine, or an engine powered by liquid petroleum gas or natural gas.

For a reactant including nitrogen oxides, the nitrogenous reductant may be metered into the flowing exhaust gas only when it is determined that the molecular sieve catalyst is capable of catalyzing $NO_x$ reduction at or above a desired efficiency, such as at above 100° C., above 150° C., or above 175° C. The determination by the control means can be assisted by one or more suitable sensor inputs indicative of a condition of the engine selected from the group consisting of: exhaust gas temperature, catalyst bed temperature, accelerator position, mass flow of exhaust gas in the system, manifold vacuum, ignition timing, engine speed, lambda value of the exhaust gas, the quantity of fuel injected in the engine, the position of the exhaust gas recirculation (EGR) valve and thereby the amount of EGR and boost pressure.

Metering may be controlled in response to the quantity of nitrogen oxides in the exhaust gas determined either directly (using a suitable $NO_x$ sensor) or indirectly, such as using pre-correlated look-up tables or maps—stored in the control means—correlating any one or more of the abovementioned inputs indicative of a condition of the engine with predicted $NO_x$ content of the exhaust gas.

The disordered molecular sieve supported transition metal catalysts described herein may exhibit improved $NH_3$—SCR activity, good thermal stability, good hydrothermal stability, and tolerate repeated lean/rich high temperature aging.

Figure 1:
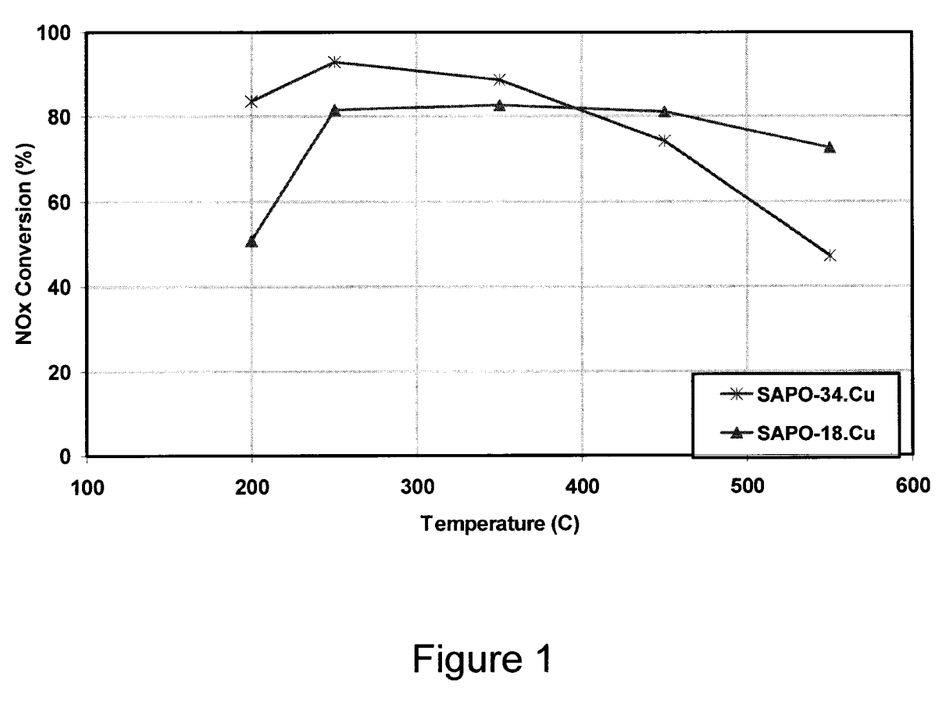
FIG. 1 is a graph illustrating $NO_x$ conversion based on temperature of pure molecular sieve supported copper catalysts (Cu/SAPO-34 and Cu/SAPO-18, respectively)
Figure 2:
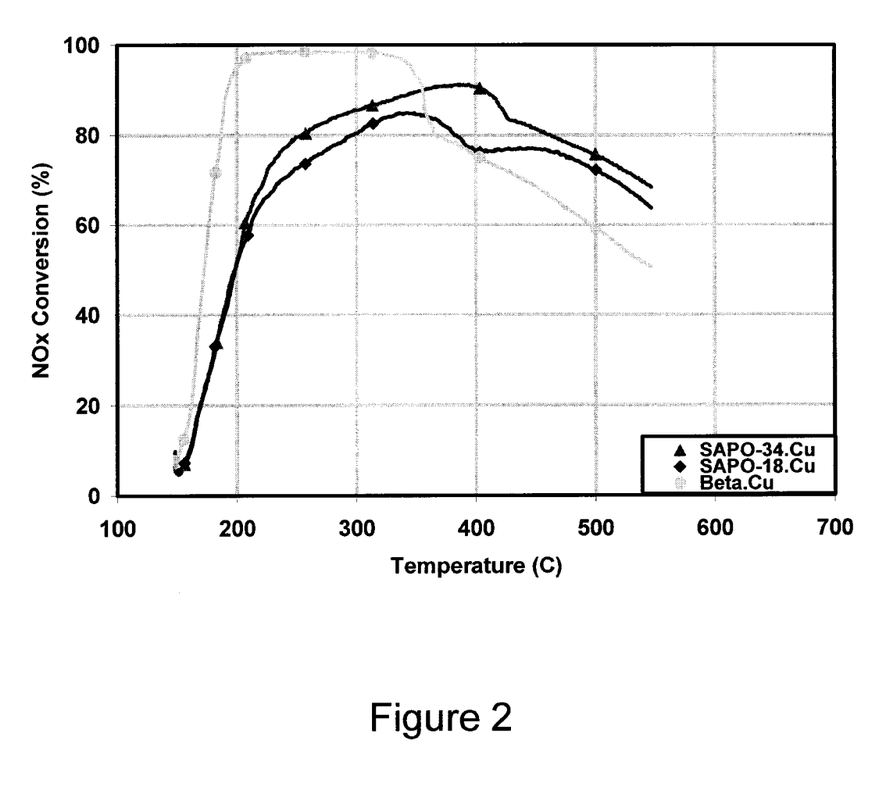
FIG. 2 is a graph illustrating $NO_x$ conversion based on temperature of copper exchanged pure molecular sieve supports SAPO-18, SAPO-34, and zeolite β, respectively, following calcination.
Figure 3:
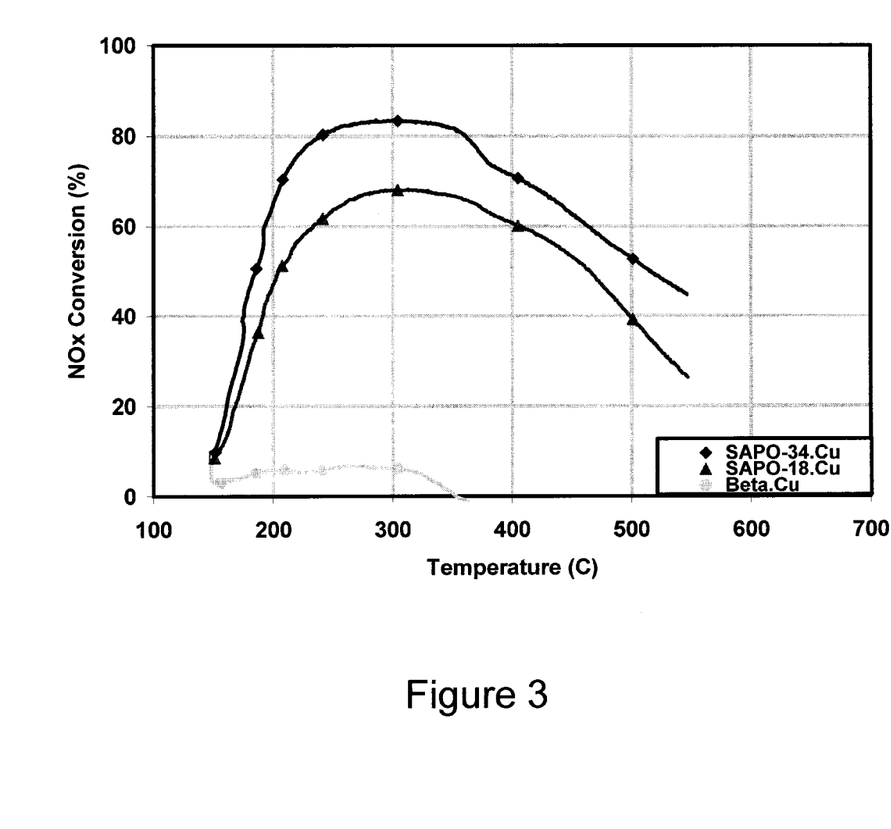
FIG. 3 is a graph illustrating $NO_x$ conversion based on temperature of copper exchanged pure molecular sieve supports SAPO-18, SAPO-34, and zeolite β, respectively, following hydrothermal aging.

FIGS. 1, 2, and 3 show $NO_x$ conversion of different ordered molecular sieve supports SAPO-18, SAPO-34, and zeolite β, with copper as the transition metal. FIG. 1 shows a comparison of the $NH_3$ SCR activity of SAPO-34.Cu and SAPO-18.Cu at different operating temperatures after aging at 900° C. for 4 hours. FIG. 2 shows a comparison of the $NH_3$ SCR activity of SAPO-18.Cu, SAPO-34.Cu, and Beta.Cu at different operating temperatures after calcination. The results indicate that SAPO-18 is comparable to SAPO-34 or Beta.Cu at different operating temperatures after calcination. FIG. 3 shows a comparison of the SCR activity of SAPO-18.Cu, SAPO-34.Cu and Beta.Cu after aging at 900° C. for 4 hours. As is evident, the SAPO-18 supported Cu catalysts exhibited comparable $NH_3$-SCR activity and thermal durability as a SAPO-34 supported Cu catalysts, but the zeolite β exhibited poor results after hydrothermal aging. Thus, the results show that SAPO-34 and SAPO-18 have excellent hydrothermal durability compared to standard zeolites.

It is envisioned that a disordered molecular sieve, such as AEI/CHA, will be used as the support for one or more transition metals, such as copper. It is expected that the mixed phase molecular sieve support will exhibit good $NO_x$ conversion. In particular, it is envisioned that the copper-AEI/CHA catalyst will exhibit good $NH_3$—SCR activity, thermal durability, and hydrothermal durability.

The entire contents of any and all patents and references cited herein are incorporated herein by reference.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

EXAMPLES

The following non-limiting examples are provided to illustrate certain aspects of the invention.

Example 1

Preparation of Copper-Loaded AEI/CHA Intergrowth Molecular Sieves

A sample of a molecular sieve material was obtained and tested to determine its structure and composition. For the sample, an X-ray Diffraction (XRD) pattern was collected on a PANalytical X'Pert PRO MPD (Multi-Purpose Diffractometer), using a copper $K_α$ radiation. The diffraction pattern was collected using programmable divergence and receiving slit maintaining a constant sample illuminated area of 10 mm and the x-rays were measured using a Real Time Multiple Strip (RTMS) detector. DIFFaX analysis was used to determine the AEI/CHA intergrowth ratio. DIFFaX is a program used to simulated powder diffraction data. The program is available from the International Zeolite Association or from the authors Michael M. J. Treacy and Michael W. Dean. The version used to generate the simulations was DIFFaX 1.813. The input file used to generate the simulation was the same as detailed in the document WO 02/070407. The simulations were generated from 5 to 120° 2θ with instrumental broadening applied to the output file and a random distribution of AEI to CHA layers. The random distribution of layers is used only for comparison to the collected data and is not meant as validation that the material is truly random distributed.

Figure 4:
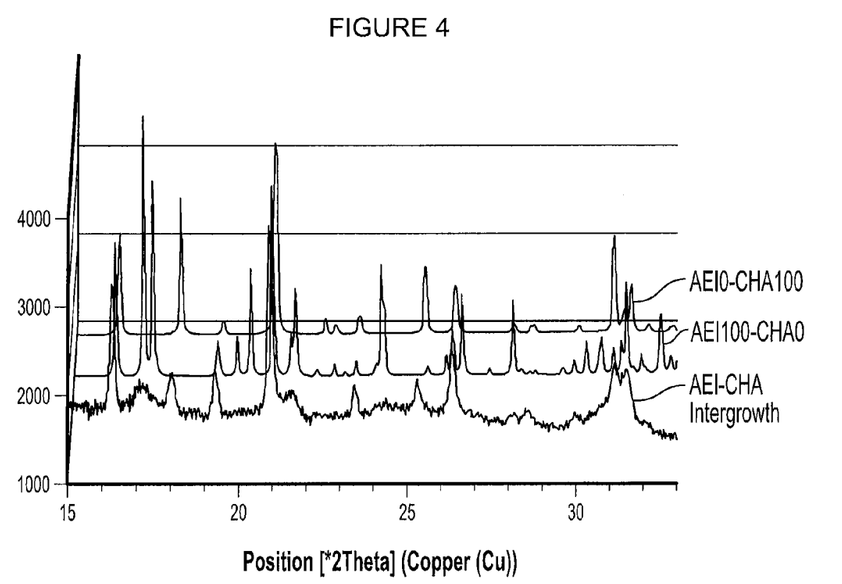
FIG. 4 is a graph illustrating DIFFaX simulation of AEI/CHA end members and intergrowth AEI/CHA.
Figure 5:
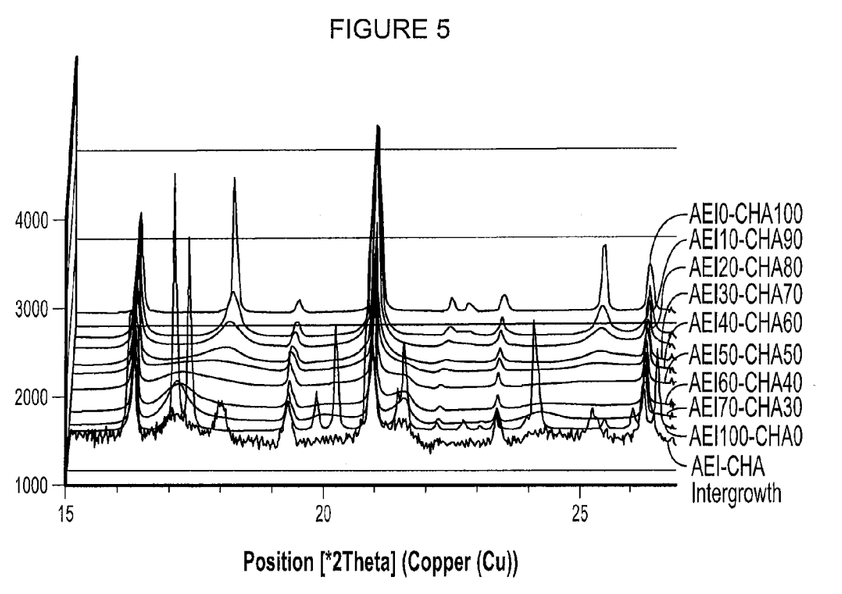
FIG. 5 is a graph illustrating the simulated diffraction produced by DIFFaX and the intergrowth AEI-CHA material.

The intergrowth of AEI/CHA is said to produce diffraction peaks at the following 2-theta (2θ) positions: 9.5-9.7, 12.9-13.1, 14.0-14.2, 16.1-16.3, 16.9-17.1, 19.1-19.3, 20.7-20.9, 21.3-21.5, 25.9-26.3 and 30.9-31.2, FIG. 4. The AEI-CHA intergrowth has peaks characteristic of an AEI structure type however the split peaks of pure AEI centered at 17.2° 2θ have been replaced in the intergrowth by the broad peak center at 17.1° 2θ. In addition the peaks associated with pure CHA at 17.8° and 24.8° 2θ are no longer detected in the intergrowth AEI-CHA material. FIG. 5 shows the simulated diffraction produced by DIFFaX and the intergrowth AEI-CHA material. The simulated AEI/CHA ratios are as follows: AEI-0/CHA-100, AEI-10/CHA-90, AEI-20/CHA-80, AEI-30/CHA-70, AEI-40/CHA-60, AEI-50/CHA-50, AEI-60/CHA-40, AEI-70/CHA-30, AEI-80/CHA-20, AEI-90/CHA-10 and AEI-100/CHA-0. All simulated patterns were scaled in intensity to the peak centered at 20.8 of the intergrowth AEI-CHA sample. The scaling of the simulated diffraction patterns allows for comparison between the various diffraction patterns.

Figure 6:
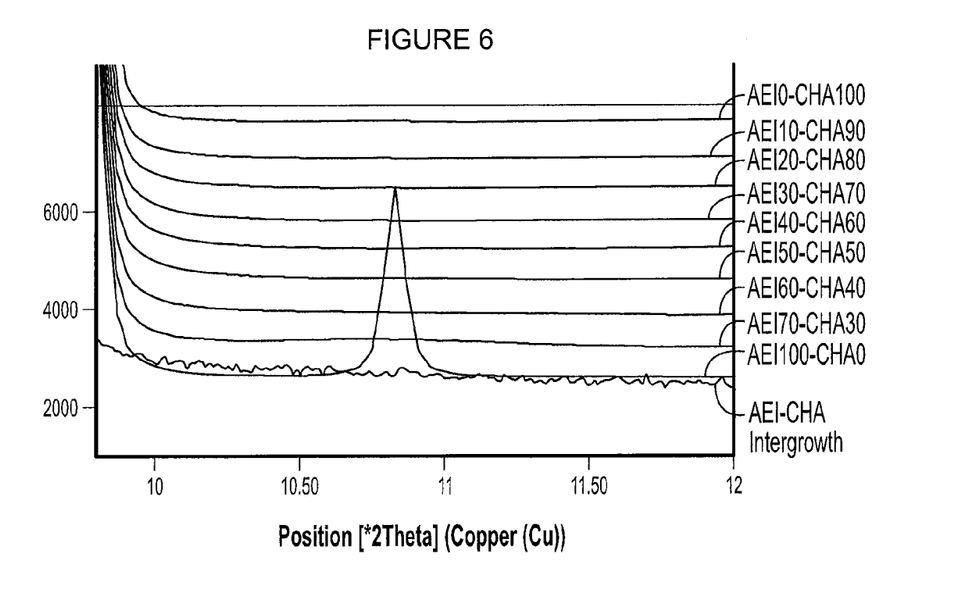
FIG. 6 is a graph illustrating the intergrowth AEI-CHA is characterized by the absence of any peak in the 9.8°-12.0° 2θ.
Figure 7:
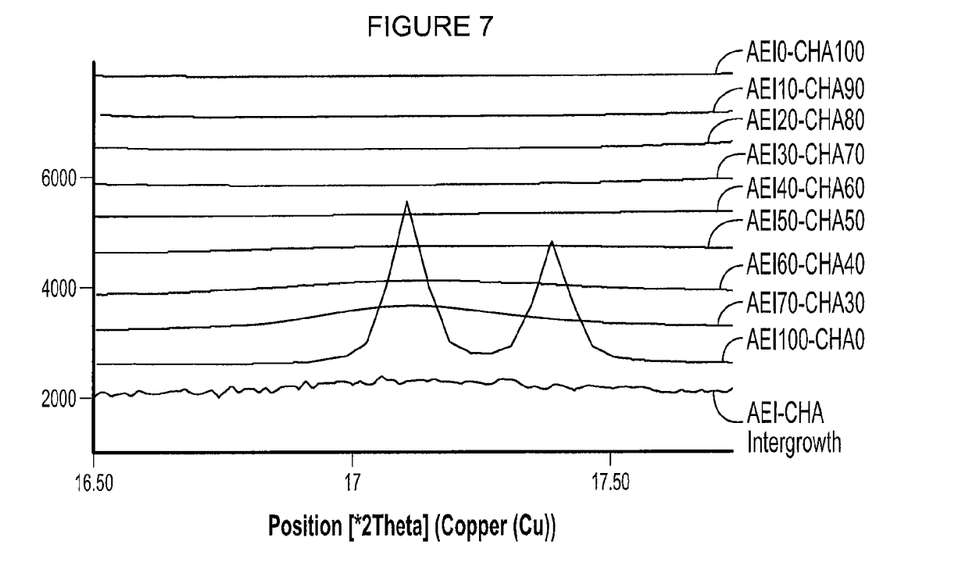
FIG. 7 is a graph illustrating the intergrowth AEI-CHA is characterized by the absence of a broad peak centered at 16.9° 2θ.
Figure 8:
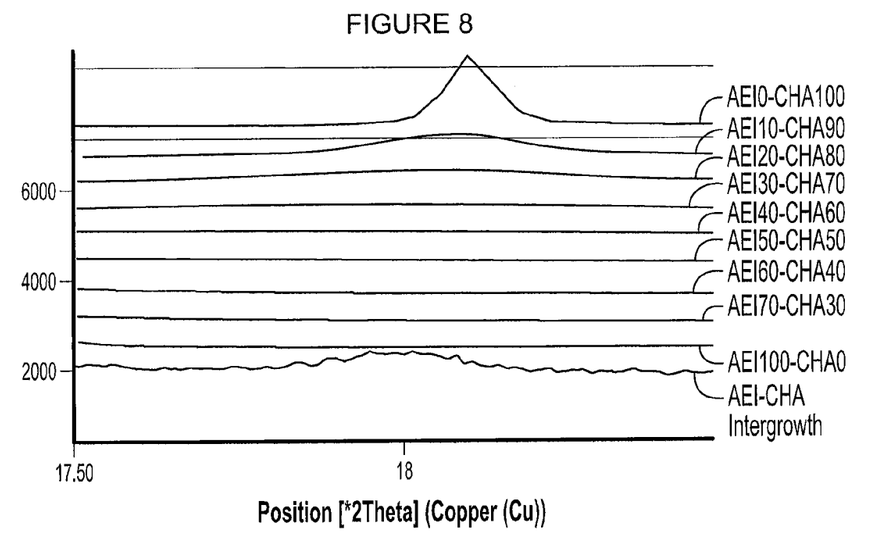
FIG. 8 is a graph illustrating that the intergrowth AEI/CHA in a 10/90 mole ratio is also distinguished by the presence of a broad peak centered at 17.9° 2θ.

By way of the comparison between the DIFFaX simulated diffraction patterns and the intergrowth AEI-CHA sample it is possible to determine the ratio of AEI-CHA in the sample. DIFFaX analysis indicated that the intergrowth AEI-CHA sample is of the ratio AEI-10/CHA90. The intergrowth AEI-CHA is characterized by the absence of any peak in the 9.8-12.0 2θ, shown in FIG. 6, and the absence of any broad peak centered at 16.9 2θ, shown in FIG. 7. An AEI-10/CHA-90 is also distinguished by the presence of a broad peak centered at 17.9° 2θ shown in FIG. 8.

Copper was added to the 10:90 AEI/CHA intergrowth by a standard technique to produce a metal-loaded molecular sieve having about 1.8 weight percent copper (based on the total weight of the molecular sieve).

Example 2

NO$_x$ Performance of Copper-Loaded AEI/CHA Intergrowth Molecular Sieves

The copper-loaded 10:90 AEI/CHA intergrowth sample was hydrothermally aged for 72 hours at 700° C. The aged material was then applied as a washcoat to a monolith honeycomb core and tested using a Synthetic Catalyst Activity Test (SCAT) rig. The testing was performed under simulated diesel exhaust gas conditions, namely exposing the catalyst to a gas at a space velocity of 50,000/hour, wherein the gas composition was about 350 ppm NH$_3$ and NO, about 14 weight % O$_2$, about 4.5 weight % H$_2$O, and about 5 weight % CO$_2$ in N$_2$. The test temperature ranged from 200 to 450° C.

Figure 9:
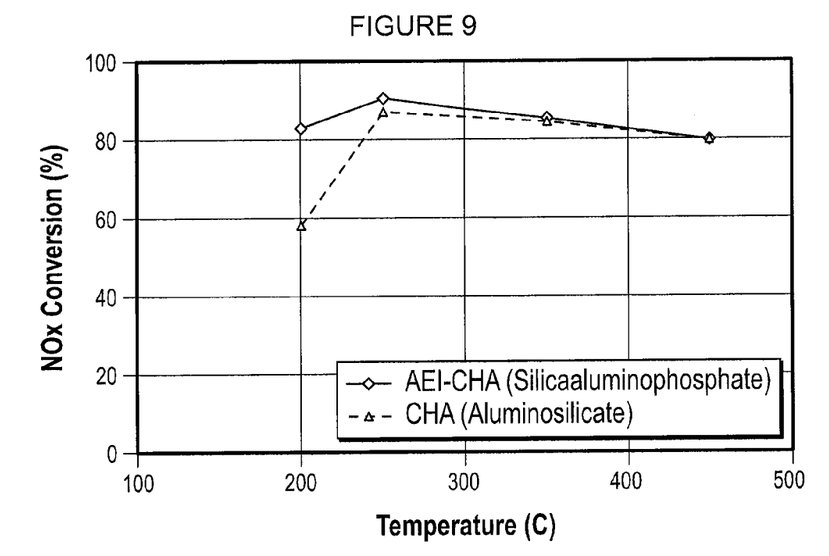
FIG. 9 is a graph illustrating that AEI/CHA intergrowths show improved performance over CHA aluminosilicates in Cu SCR formulations following 700° C./72 h hydrothermal aging.

The sample was tested to determine its capacity for NO conversion (e.g. into N2 and O2) as a function of temperature. The results are shown in FIG. 9.

For comparison, a sample having only a CHA framework was also tested. The comparative sample was loaded with a similar amount of copper, underwent similar hydrothermal aging, and was tested using the SCAT rig under similar conditions. The comparative data is also shown in FIG. 9.

What is claimed is:

1. A method for treating an exhaust gas comprising:
   a. contacting an exhaust gas stream comprising NOx and a reducing agent with a supported metal catalyst comprising:
      i. one or more transition metals selected from the group consisting of Cr, Mn, Fe, Co, Ce, Ni, Cu, Zn, Ga, Mo, Ru, Rh, Pd, Ag, In, Sn, Re, Ir, Pt, and mixtures thereof, and
      ii. a support comprising a molecular sieve having at least one intergrowth phase comprising at least two different small-pore, three-dimensional framework structures,
   wherein each framework structure in said intergrowth has a maximum of eight ring members,
   wherein the one or more transition metals are disposed inside the pores of the molecular sieve, on the external surface of the molecular sieve, or both inside the pores and on the external surface of the molecular sieve and
   wherein said transition metal is present in an amount of about 0.01 to about 6 weight percent, based on the total weight of the molecular sieve;
   b. selectively reducing at least a portion of said NO$_x$ with said reducing agent to produce N$_2$ and H$_2$O.

2. The method of claim 1, wherein said exhaust gas stream is generated by a lean-burn engine.

3. The method of claim 1, wherein said reducing agent is ammonia.

4. The method of claim 1, wherein said reducing agent is a hydrocarbon.

5. The method of claim 1, wherein said contacting occurs at a temperature of about 150° C. to about 750° C.

6. The method of claim 1 wherein said contacting occurs at a temperature of at least 900° C.

7. The method of claim 2, wherein said intergrowth phase consists essentially of a first small-pore, three-dimensional framework structure and a second small-pore, three-dimensional framework structure, wherein said first and second framework structures are present in a mole ratio of said first framework structure to said second framework structure of about 1:99 to about 99:1.

8. The method of claim 7, wherein one of said first or second framework structures is selected from the group consisting of AEI, GME, AFX, AFT, and LEV, and the other of said first or second framework structures is CHA.

9. The method of claim 8, wherein said one framework structure is an aluminosilicate and one framework structure is a silico-aluminophosphate.

10. The method of claim 8, wherein said first framework structure is AEI and said second framework structure is CHA.

11. The method of claim 10, wherein said first and second framework structures are silicoaluminophosphates.

12. The method of claim 11, wherein said mole ratio is about 1:99 to about 50:50.

13. The method of claim 12, wherein said mole ratio is about 5:95 to about 20:80.

14. The method of claim 10, wherein said molecular sieve comprises SAPO-18 and SAPO-34 and said mole ratio is about 1:99 to about 50:50.

15. The method of claim 14, wherein said mole ratio is about 5:95 to about 15:85.

16. The method of claim 1, wherein said transition metal is selected from the group consisting of Cu, Fe, Co, Pt, and Mn.

17. The method of claim 1, wherein said transition metal is Cu.

18. The method of claim 11, wherein said transition metal is present in an amount of about 1 to about 3 weight percent based on the total weight of the molecular sieve, and is selected from the group consisting of Cu, Fe, Co, Pt, and Mn.

19. The method of claim 18, wherein said transition metal is selected from the group consisting of Cu and Fe.

* * * * *